United States Patent

Farrell

[15] 3,648,973
[45] Mar. 14, 1972

[54] CONNECTING AND TENSIONING DEVICE FOR THE IN SITU REPAIR OF BROKEN DRIVE CHAINS AND TRACKS

[72] Inventor: Buster F. Farrell, 733 N.E. Buffalo Street, Portland, Oreg. 97211

[22] Filed: Oct. 29, 1970

[21] Appl. No.: 85,209

[52] U.S. Cl. .................................................. 254/67
[51] Int. Cl. .................................................. B66f 3/08
[58] Field of Search .......................... 254/67; 269/244

[56] References Cited

UNITED STATES PATENTS

| | | | |
|---|---|---|---|
| 762,060 | 6/1904 | Huhn | 254/67 |
| 3,002,726 | 10/1961 | Ford | 254/67 |
| 3,061,302 | 10/1962 | Dennis | 269/244 X |

Primary Examiner—Andrew R. Juhasz
Assistant Examiner—David R. Melton
Attorney—Eugene D. Farley

[57] ABSTRACT

A device is provided for interconnecting in situ the links of a broken drive chain or drive track and tensioning the chain or track so that it may be repaired. The device consists of an elongated frame provided with a longitudinal guide, fixed and sliding blocks on one side, and fixed and sliding dogs on the other side. A screw interconnects the two blocks and connecting means connects the sliding dog to the sliding block. In use, the dogs are inserted through the chain or track on each side of the break while the chain or track still is mounted on its supporting frame. Application of screw pressure moves the sliding dog and tensions the chain or track so that the break may be repaired.

5 Claims, 4 Drawing Figures

PATENTED MAR 14 1972 3,648,973
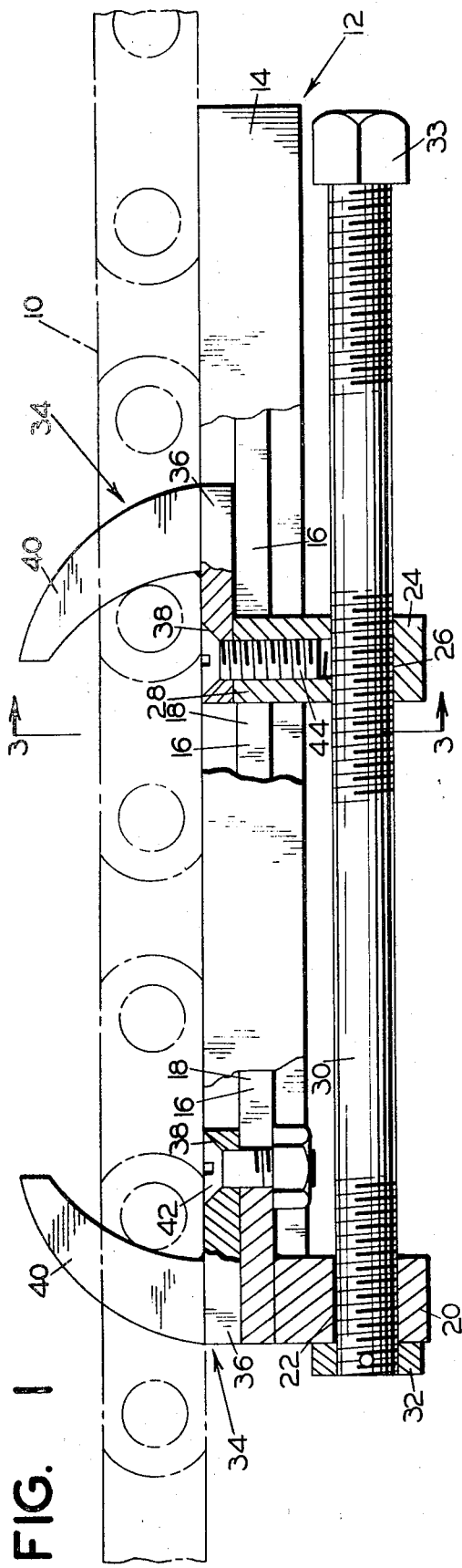
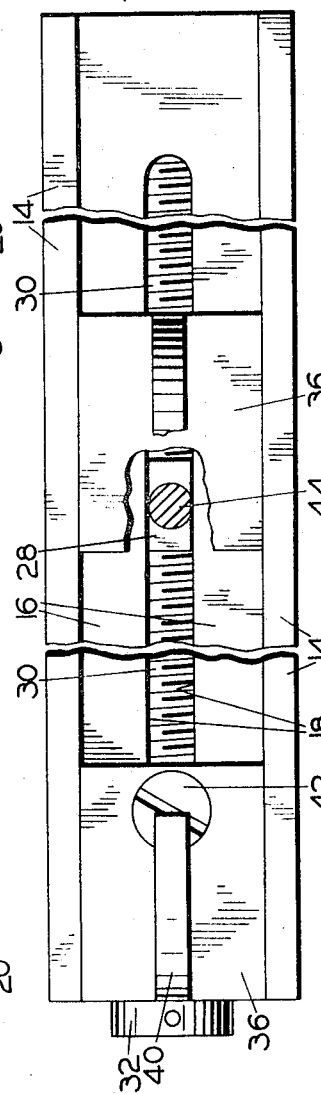
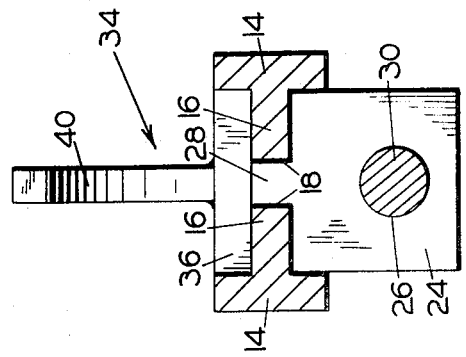
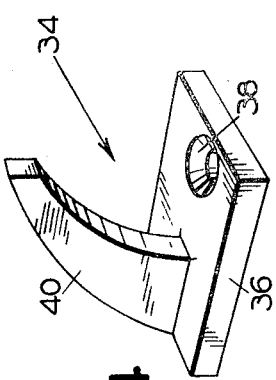
BUSTER F. FARRELL
INVENTOR.
BY Eugene D. Farley
ATTY.

CONNECTING AND TENSIONING DEVICE FOR THE IN SITU REPAIR OF BROKEN DRIVE CHAINS AND TRACKS

This invention relates to a connecting and tensioning device for the in situ repair of broken drive chains and tracks.

In the operation of heavy vehicles, situations often occur in which a drive chain or track breaks and requires repair. Such situations occur, for example, with respect to the tracks on caterpillar tractors and cement machines. It also may occur in mill installations including chain and sprocket drive trains.

Where the drive installations are massive, making the repair is a difficult matter. In the case of a heavy tractor, for example, the track tensioning adjustment has to be loosened, the vehicle jacked up, and the track removed and conveyed to a repair shop. After the track has been repaired, the reverse sequence must be followed. This all requires a great deal of time and effort and involves substantial expense, not only because of the cost of making the repair itself but also because of the resulting downtime of expensive equipment.

The general purpose of the present invention is to provide a device for connecting and tensioning broken drive chains and tracks so that broken parts may be repaired and the broken ends joined in situ, without loosening the tensioning adjustments, without jacking up the equipment, and without removing the chain or track from its operative position.

The manner in which the foregoing and other objects of this invention are accomplished will be apparent from the accompanying specification and claims considered together with the drawings, wherein:

FIG. 1 is a view in side elevation, partly in section, of the herein described connecting and tensioning device, illustrated in its application to the connecting and tensioning of a massive chain drive;

FIG. 2 is a fragmentary plan view of the device, partly broken away to reveal concealed construction;

FIG. 3 is a transverse sectional view taken along line 3—3 of FIG. 1; and

FIG. 4 is a detail perspective view of a dog, or chain engaging element, which is a primary component of the herein described device.

In its broad aspect, the connecting and tensioning device of my invention comprises an elongated frame, substantially H-shaped in cross section. The frame includes a pair of sidepieces and a longitudinally slotted connecting web providing top and bottom guideways. Fixed and sliding blocks are mounted on one side of the frame. Fixed and sliding dogs are mounted on the other side of the frame. A screw drive interconnects the fixed and sliding blocks. Connecting means connect the sliding dog to the sliding block, through the slot in the frame web.

In use, the two dogs are inserted in the chain or track, one on each side of the break. This connects the loose ends. Operation of the screw drives the dogs toward each other, thereby tensioning the system. This maintains the chain or track in its mounted position and at the same time affords slack in the area of the break so that broken links may be removed, pads replaced, or whatever is needed done to consummate the repair. The ends of the chain or track then are joined and the repair device removed. This completes the operation without removing the chain or track from its operative location.

Considering the foregoing in greater detail and with particular reference to the drawings:

The connecting and tensioning device of my invention is adapted for application on a heavy industrial chain or track, indicated at 10 of FIG. 1. The device is supported on a frame indicated generally at 12. The frame is generally H-shaped in cross section, FIG. 3, and includes a pair of sidepieces 14 interconnected by a web member 16. A guide slot 18 is present in the web member, extending longitudinally thereof for substantially its entire length.

In this manner there are provided in the frame an upper guideway and a lower guideway communicating with each other through slot 18.

A fixed block 20 is fixed to the underside of the frame and extends laterally outwardly therefrom. It is provided with a transverse opening 22.

A sliding block 24 is slidably mounted in the lower guideway. It is provided with a transverse, threaded opening 26 and an upwardly extending neck 28 dimensioned for sliding reception in slot 18. Opening 22 in the fixed block and threaded opening 26 in the sliding block substantially register with each other.

Screw means interconnect the two blocks for driving the sliding block toward and away from the fixed block.

As shown particularly in FIG. 1, the screw means comprises an elongated screw 30 which penetrates both openings and is threaded into opening 26.

The outer end of the screw mounts a fixed stop or abutment 32 which bears against the outer end surface of fixed block 20. The inner end of the screw mounts a fixed head 33 by means of which the screw is operated.

Dog means are provided for engaging the broken ends of the chain or track.

In the illustrated form of the invention, the two dogs are identical in construction and are indicated generally at 34. As shown in FIG. 4, each dog comprises a flat base 36 dimensioned for reception in the upper guideway of the frame and provided with a transverse bolthole 38.

A dog 40 is welded or otherwise fixed to the base and extends laterally outwardly therefrom. The dog 40 may assume various configurations and be variously dimensioned depending upon contemplated applications. However, for engaging the links of a heavy chain, or the pads of a heavy track, the dog appropriately may have the inclined, arcuate configuration illustrated.

One of dogs 34 is fixed, the other slidable to provide companion components for the fixed and slidable blocks.

Thus opposite fixed block 20 there is provided a fixed dog 34 which is maintained in position by means of a bolt 42. This penetrates slot 18 and mounts the fixed dog diametrically opposite fixed block 20.

Sliding dog 34, on the other hand is secured by means of a screw 44 which penetrates the hole in the dog base and is threaded into the neck 30 of sliding block 24. Thus the dog is demountably mounted on the sliding block as required for its original installation, as well as for repair and replacement.

The manner of use of the tool is illustrated in FIG. 1. The two dogs are inserted behind the cross pins of chain 10, one on each side of the break. This may be accomplished by backing off screw 30, but without demounting the chain and without even backing off the massive tensioning adjustments of the chain assembly.

Screw 30 is advanced until chain 10 is under sufficient tension to maintain it in place while the necessary repair is made. The ends of the chain then are coupled together, screw 30 backed off, and the device removed.

Where the tracks of a tracked vehicle are to be repaired, dogs 34 may be inserted in openings with which the track plates are provided, and the same operating sequence followed.

Drive chains and tracks of massive size thus may be repaired simply, rapidly and without removing them from the vehicle or plant installation.

Having thus described my invention in preferred embodiments, I claim:

1. A connecting and tensioning device for the in situ repair of broken drive chains and tracks comprising:
   a. an elongated frame substantially H-shaped in cross section and including a pair of sidepieces and a longitudinally slotted connecting web providing top and bottom longitudinal guideways,
   b. a fixed block fixed to one end of the frame and extending laterally from the bottom thereof,
   c. a sliding block slidably mounted in the bottom guideway,
   d. screw means interconnecting the fixed and sliding blocks,
   e. first dog means fixed to said one end of the frame and extending laterally outwardly from the top thereof, f. second dog means slidably mounted in the upper guideway and extending laterally outwardly therefrom, and g. connecting means penetrating the slot in the frame web and interconnecting the sliding block and the second dog means.

2. The device of claim 1 wherein the fixed and sliding blocks have substantially registering transverse openings therethrough, the opening through the sliding block being threaded, and wherein the screw means comprises a screw penetrating both openings and in threaded engagement with the threaded opening.

3. The device of claim 1 wherein the first dog means comprises a base dimensioned to seat in the upper guideway, an inwardly inclined dog projecting laterally outwardly from the base, and bolt means interengaging the base and the underlying slot in the web, thereby securing the dog means to the frame.

4. The device of claim 1 wherein the second dog means comprises a base dimensioned for slidable reception in the upper guideway, and inwardly inclined dog extending laterally outwardly from the base, and screw means penetrating the base and underlying slot and in threaded engagement with the sliding block, thereby removably securing the second dog means to the sliding block.

5. The device of claim 4 wherein the sliding block includes an upwardly projecting neck dimensioned for sliding reception in the web slot and underlying and engaging the base of the second dog means.

* * * * *